United States Patent
Casse et al.

(10) Patent No.: US 9,935,370 B2
(45) Date of Patent: Apr. 3, 2018

(54) MULTIBAND RADIO FREQUENCY (RF) ENERGY HARVESTING WITH SCALABLE ANTENNA

(71) Applicant: Palo Alto Research Center Incorporated, Palo Alto, CA (US)

(72) Inventors: Bernard D. Casse, Saratoga, CA (US); George Daniel, Palo Alto, CA (US); Armin R. Volkel, Mountain View, CA (US); Victor Liu, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 325 days.

(21) Appl. No.: 14/582,033

(22) Filed: Dec. 23, 2014

(65) Prior Publication Data

US 2016/0181868 A1    Jun. 23, 2016

(51) Int. Cl.
  *H01F 27/42*   (2006.01)
  *H01Q 5/25*    (2015.01)
  (Continued)

(52) U.S. Cl.
  CPC .............. *H01Q 5/25* (2015.01); *H01Q 1/248* (2013.01); *H01Q 9/26* (2013.01); *H02J 50/27* (2016.02)

(58) Field of Classification Search
  None
  See application file for complete search history.

(56) References Cited

U.S. PATENT DOCUMENTS 3,929,594 A   12/1975   Fromson
4,065,364 A   12/1977   Fromson
(Continued)

FOREIGN PATENT DOCUMENTS

CN    102778144       11/2012
CN    103312042 A     9/2013
(Continued)

OTHER PUBLICATIONS

Aoyama, Takahiko et al. "Energy response of a full-energy-absorption neutron spectrometer using boron-loaded liquid scintillator BC-523", Nuclear Instruments and Methods in Physics Research A 333 (1993) 492-501, 10 pages.

(Continued)

*Primary Examiner* — Cassandra Cox
(74) *Attorney, Agent, or Firm* — Bever, Hoffman & Harms, LLP

(57) ABSTRACT

A radio frequency (RF) energy harvesting device including a scalable metamaterial resonator antenna and a rectifying circuit formed on a flexible plastic substrate. The metamaterial resonator antenna includes a metal (e.g., silver) structure that is conformally fixedly disposed (i.e., either printed or deposited/etched) on the flexible substrate and configured to resonate at RF frequencies using primary and secondary antenna segments connected by linking segments such that captured RF signals are generated at two antenna end points that are 180° out-of-phase with each other. The rectifying circuit including additional metal structures that are also printed or otherwise formed on the flexible substrate, and one or more circuit elements that are configured to pass positive voltage pulses from the captured RF signals to an output node. Various metamaterial resonator antenna configurations are disclosed.

22 Claims, 10 Drawing Sheets

(51) Int. Cl.
*H01Q 1/24* (2006.01)
*H01Q 9/26* (2006.01)
*H02J 50/27* (2016.01)

(56) References Cited

U.S. PATENT DOCUMENTS

| | | | |
|---|---|---|---|
| 4,315,873 | A | 2/1982 | Smith et al. |
| 4,779,000 | A | 10/1988 | Ing |
| 5,043,739 | A | 8/1991 | Logan et al. |
| 5,712,166 | A | 1/1998 | Broan |
| 5,905,263 | A | 5/1999 | Nishizawa |
| 7,002,517 | B2 | 2/2006 | Noujeim |
| 8,621,245 | B2 | 12/2013 | Shearer et al. |
| 8,680,945 | B1 | 3/2014 | Wang |
| 2002/0180639 | A1 | 12/2002 | Rickett |
| 2004/0207486 | A1 | 10/2004 | York |
| 2004/0238751 | A1 | 12/2004 | Penn |
| 2006/0234505 | A1 | 10/2006 | Asano et al. |
| 2008/0049228 | A1 | 2/2008 | Chan |
| 2008/0143192 | A1 | 6/2008 | Sample |
| 2009/0067208 | A1 | 3/2009 | Martin |
| 2009/0152954 | A1 | 6/2009 | Le |
| 2009/0207000 | A1 | 8/2009 | Mickle et al. |
| 2009/0220802 | A1 | 9/2009 | Faber et al. |
| 2009/0284351 | A1 | 11/2009 | Rossman et al. |
| 2011/0242863 | A1 | 10/2011 | Park |
| 2011/0303850 | A1 | 12/2011 | Barillon |
| 2011/0309686 | A1* | 12/2011 | Scherbenski .......... H02J 17/00 307/104 |
| 2012/0133547 | A1 | 5/2012 | MacDonald et al. |
| 2012/0314541 | A1 | 12/2012 | Matsuura |
| 2013/0076570 | A1* | 3/2013 | Lee .................. H01Q 9/045 343/700 MS |
| 2013/0187830 | A1* | 7/2013 | Warnick ............... H01Q 5/35 343/893 |
| 2014/0131023 | A1 | 5/2014 | Raman et al. |
| 2014/0266946 | A1 | 9/2014 | Bily et al. |
| 2014/0300520 | A1 | 10/2014 | Nguyen et al. |
| 2014/0355381 | A1 | 12/2014 | Lai et al. |
| 2015/0214927 | A1 | 7/2015 | Greene et al. |
| 2015/0229028 | A1 | 8/2015 | Bily et al. |
| 2015/0236551 | A1 | 8/2015 | Shearer et al. |
| 2015/0276489 | A1 | 10/2015 | Cumming |
| 2015/0318618 | A1 | 11/2015 | Chen et al. |
| 2015/0372389 | A1 | 12/2015 | Chen et al. |
| 2015/0380973 | A1 | 12/2015 | Scheb |
| 2016/0145214 | A1 | 5/2016 | Douce |
| 2016/0181867 | A1* | 6/2016 | Daniel .................... H01Q 9/16 307/104 |
| 2016/0254844 | A1* | 9/2016 | Hull .................... H04B 5/0062 340/6.1 |
| 2016/0336198 | A1* | 11/2016 | Singleton ............. H01L 21/561 |
| 2016/0359378 | A1* | 12/2016 | Kuhn ................... H02M 1/126 |

FOREIGN PATENT DOCUMENTS

| | | |
|---|---|---|
| WO | 200143228 A | 6/2001 |
| WO | 2007015281 | 2/2007 |
| WO | 2013039926 | 3/2013 |
| WO | 2015038203 | 3/2015 |

OTHER PUBLICATIONS

Flaska, Marek et al., "Digital pulse shape analysis for the capture-gated liquid scintillator BC-523A", Nuclear Instruments and Methods in Physics Research A 599 (2009) 221-225, 5 pages.

Vanier, Peter E., et al., "Directional detection of fission-spectrum neutrons", 1-4244-1302-8/07, 2007 IEEE, 5 pages.

Vanier, Peter E., et al., "Calibration and Testing of a Large-Area Fast-Neutron Directional Detector", Brookhaven National Laboratory, BNL-79632-2007-CP, 8 pages.

Mascarenhas, Nicholas, et al., "Directional Neutron Detectors for Use with 14 MeV Neutrons", Sandia Report, SAND2005-6255, printed Oct. 2005, 32 pages.

Mirenda, Martin, et al., "Ionic liquids as solvents for liquid scintillation technology, Cerenkov counting with 1-Butyl-3-Methylimidazolium Chloride", Radiation Physics and Chemistry 98 (2014) 98-102, 5 pages.

Swiderski, L., et al., "Further Study of Boron-10 Loaded Liquid Scintillators for Detection of Fast and Thermal Neutrons", IEEE Transactions on Nuclear Science, vol. 57, No. 1, Feb. 2010, 6 pages.

Pratap et al., "Plasmonic Properties of Gold-Coated Nanoporous Anodic Alumina With Linearly Organized Pores," Pramana—J. Phys. (Dec. 2014), vol. 83, No. 6, pp. 1025-1033.

Noh et al., Highly Self-Assembled Nanotubular Aluminum Oxide by Hard Anodization, (Jan. 29, 2011), J. Mater. Res., vol. 26, Issue 2, pp. 186-193.

Juan Li et al., "Facile Method for Modulating the Profiles and Periods of Self-Ordered Three-Dimensional Alumina Taper-Nanopores," ACS Appl. Mater. Interfaces 2012, 4, 5678-5683.

Juan Li et al., "Tailoring Hexagonally Packed Metal Hollow-Nanocones and Taper-Nanotubes by Template-Induced Preferential Electrodeposition," ACS Appl. Mater. Interfaces 2013, 5, 10376-10380.

* cited by examiner

MULTIBAND RADIO FREQUENCY (RF) ENERGY HARVESTING WITH SCALABLE ANTENNA

FIELD OF THE INVENTION

This invention relates to multiband radio frequency (RF) energy harvesting, and more particularly to a low-cost, scalable RF energy harvesting device.

BACKGROUND OF THE INVENTION

A rectenna (rectifying antenna) is a special type of antenna that is used to convert radio wave energy into direct current electricity. Rectennas are used in wireless power transmission systems that transmit power by radio waves. A typical rectenna element consists of a dipole antenna with a diode connected across the dipole elements. The diode rectifies the alternating current (AC) induced in the antenna by the radio waves to produce direct current (DC) power, which is then used to power a load connected across the diode. Schottky diodes are usually used because they have the lowest voltage drop and highest speed and therefore have the lowest power losses due to conduction and switching. Large rectennas consist of an array of many such dipole elements.

There exists a significant motivation to develop rectennas that efficiently capture RF energy. Due to the increasing use of radio frequency (RF) signals to transmit information, the presence of RF energy is almost ubiquitous. Moreover, the unused portions of transmitted RF signals (i.e., portions that are not captured and converted by a receiver) are essentially "wasted" in that the energy transmitted in unused RF signals is absorbed in ambient matter and thus lost. As such, in addition to providing power sources for remote/portable devices, a suitable rectenna capable of efficiently re-converting unused ambient RF energy would reduce overall energy demand by replacing batteries and other remote power sources.

Conventional rectennas capable of converting RF energy to DC power are unable to harvest most ambient RF energy. Existing RF rectennas can only produce usable DC voltages in the presence of high RF power density levels (typically above 1 W/m$^2$), and are therefore typically used in wireless power transmission systems where dedicated high-power transmitters generate RF energy at sufficiently high energies. Ambient RF energy is typically very low (from mW down to µW), and thus the use of conventional RF rectennas for energy harvesting has proven to be insufficient in remote locations. Also, conventional rectenna devices utilize antennas are single band (i.e., harvest narrow-band RF signals) and rectifying circuits are bulky, and therefore not scalable.

What is needed is a low-cost, high-conversion-efficiency and electrically-small RF rectenna that is capable of reliably harvesting ambient RF energy. In particular, what is needed is an RF energy harvesting device capable of harvesting multiband RF signal energy having low energy levels (i.e., tens of mW and below) including an antenna that can be scaled to accommodate different RF frequencies, thereby facilitating energy generation for remote devices (e.g., sensors) using a wide range of RF signal sources.

SUMMARY OF THE INVENTION

The present invention is directed to space-efficient RF energy harvesting devices (rectennas) that utilize novel metamaterial resonator antennas that are electrically-small and are capable of near-perfect RF energy absorption. The metamaterial resonator antenna includes one or more metal structures that are conformally fixedly disposed on a substrate (e.g., formed by printing a conductive (e.g., silver) ink or depositing/etching a metal layer) in a manner that facilitates low-cost fabrication using printed electronics techniques. The at least one metal structure forming the metamaterial resonator antenna includes two primary antenna segments and at least one secondary antenna segment that are disposed in a spaced-apart (parallel) folded arrangement and connected by two linking segments such that the overall antenna structure resonates at RF frequencies that are within an associated bandwidth range, and are configured such that captured RF signals generated at the two antenna end points are 180° out-of-phase from each other. Metamaterial resonator antennas such as those described herein can be tailored to have high impedance and exhibit near-perfect absorption. The rectifying circuit is coupled to the antenna end points, and includes circuit elements (one or more diodes, capacitors, inductors and/or resistors) that are configured to combine positive voltage pulses from the two captured RF signals to generate a usable output voltage. In some embodiments, the metamaterial resonator antenna arrangement facilitates nesting a smaller antenna within open spaces of a larger antenna, thereby facilitating capturing a wide range of RF frequencies without significantly changing the device's footprint (size), and thereby providing a highly scalable platform that facilitates remotely powering widely dispersed IC devices (e.g., sensors, processors, etc.) using either pre-existing RF signals (e.g., from ambient Wi-Fi signals) or dedicated charging RF sources. Moreover, because the metamaterial resonator antenna arrangement is formed on a substrate and can be configured for different RF frequencies, the present invention facilitates the low-cost production of RF energy harvesting device using inexpensive flexible plastic substrates and cost-effective printed electronics techniques, thereby minimizing overall manufacturing costs while maximizing the RF frequency band that can be converted into usable energy.

According to an embodiment of the invention, the rectifying circuit includes conductive structures that are conformally disposed on the substrate surface (i.e., generated during the same ink-jet printing run) with the antenna in order to further minimize manufacturing costs. In one embodiment, the rectifying circuit utilizes a conventional voltage doubler circuit (e.g., a Greinacher circuit) to combine the two captured RF signals in order to generate a usable output voltage. In a presently preferred embodiment, the rectifying circuit utilizes two dissimilar Zero Bias Schottky diodes and a capacitor that are configured to combine the two captured RF signals in a way that generates an output voltage with minimal energy loss. When the metamaterial resonator antennas of the present invention are combined with these novel rectifying circuits, the resulting RF energy harvesting devices exhibit high energy conversion efficiencies.

According to various embodiments of the present invention, the metamaterial resonator antenna is implemented using a novel two-part dipole antenna arrangement made up of two bilaterally symmetrical metal elements. In this case, each metal element includes one of the primary antenna segments, one of the linking segment, and a secondary antenna segment portion that extending from the linking segment to a distal end point located adjacent to one of the antenna end point. The primary antenna segment and the secondary antenna segment portion are concentrically arranged (i.e., such that they are separated by a uniform gap spacing), which produces the desired captured RF signal characteristics. In one series of specific embodiments, the primary and secondary segment portions are formed by straight (linear) wire segments that are connected at one or more 90° angles (corners), wherein "tuning" the antenna to resonate at a targeted RF frequency involves increasing the length of one or more of the straight segments, or utilizing two or three interconnected segments. With this arrangement, the antenna can be "tuned" to capture a wide range of RF frequencies without substantially increasing the antenna footprint. In other embodiments the primary and secondary segment portions are formed by concentric curved (e.g., semi-circular) wire segments that are connected by a linking segment. In one embodiment the linking segment is implemented using a step-shaped wire that allows the primary and secondary segments to have identical lengths.

According to various other embodiments of the present invention, the metamaterial resonator antenna is implemented using a novel "racetrack-type" configuration formed by a single contiguous metal structure having a shape similar to an oblong rectangle with rounded ends, where portions of the rounded end "curves" extends into the interior "infield" regions. In this case, the primary antenna segments are collinear and extend in opposite directions (e.g., downward and upward) from the antenna end points, a single secondary antenna segment is disposed parallel to and spaced from the primary segments, and a pair of "open circle" linking segments 123H-31/32 are used to connect the primary and secondary segments, thereby forming a racetrack-shaped structure including curved end segments extending from each of the "open circle" linking segments into the "infield" portion of the racetrack. This arrangement was found to capture RF signals over a substantially higher range than the two-part antenna design (described above), and is further "tunable" by way of changing the gap separating adjacent curved end points, or by adding one or more additional "racetracks" to the antenna structure.

The present invention is further directed to systems in which multiple RF energy harvesting devices including metamaterial resonator antennas and associated rectifying circuits are interconnected to generate a combined output voltage.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in RF energy harvesting. The following description is presented to enable one of ordinary skill in the art to make and use the invention as provided in the context of a particular application and its requirements. The terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly connected by way of a metal line, or indirectly connected by way of an intervening circuit element (e.g., a capacitor, resistor, inductor, or by way of the source/drain terminals of a transistor). Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
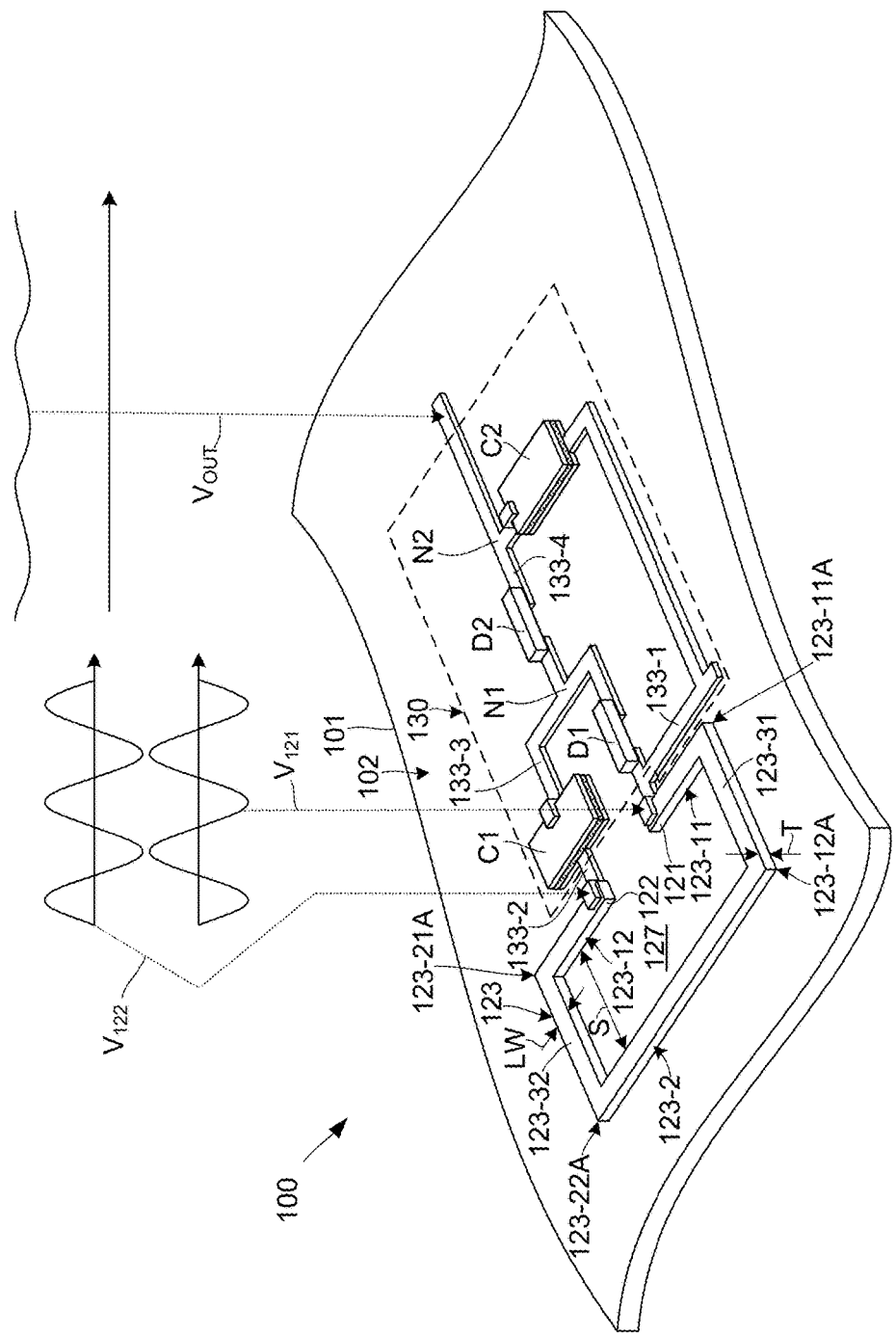
FIG. 1 is a top side perspective view showing an RF energy harvesting device according to an embodiment of the present invention.

FIG. 1 is a top side perspective view showing an RF energy harvesting device 100 according to a generalized embodiment of the present invention. RF energy harvesting device 100 utilizes a novel metamaterial resonator antenna 120 and a rectifying circuit 130.

Metamaterial resonator antenna 120 includes at least one metal structure 123 that is conformally fixedly disposed on a substrate 101 (e.g., formed by printing a conductive (e.g., silver) ink or depositing/etching a metal layer) in a manner that facilitates low-cost fabrication using printed electronics techniques. Metal structure 123 includes two primary antenna segments 123-1 and 123-2 and at least one secondary antenna segment 123-2 that are disposed in a spaced-apart (parallel) folded arrangement and connected by two linking segments 123-31 and 123-32. Specifically, first primary antenna segment 123-11 extends from a first antenna end point 121 to a first midpoint 123-11A, and second primary antenna segment 123-12 extends from a second antenna end point 122 to a second midpoint 123-21A. Secondary antenna segment 123-2 is disposed parallel to and spaced from the first and second primary antenna segments by a uniform gap distance S, with secondary antenna segment 123-2 having a first end disposed at a third midpoint 123-12A and an opposing second end disposed at a fourth midpoint 123-22A. First linking segment 123-31 is connected between first and third midpoints 123-11A and 123-12A, and second linking segment 123-32 connected between second and fourth midpoints 123-21A and 123-22A, with these linking segments being substantially shorter than primary and secondary segments. Each of these segments consists of an elongated metal line structure having a thickness T (e.g., 8 microns) and a line width LW (e.g., 2.5 mm). By adjusting the overall length of primary antenna segments 123-11 and 123-12 and secondary antenna segment 123-2, the overall antenna structure is tailored to resonate at RF frequencies that are within an associated target bandwidth range, and are configured such that captured RF signals $V_{121}$ and $V_{122}$ generated at antenna end points 121 and 122 are 180° out-of-phase from each other. Metamaterial resonator antenna 120 is electrically-small and, when combined with certain rectifying circuits, facilitates near-perfect RF energy absorption. An advantage of metamaterial resonator antennas formed in accordance with the present invention, such as those described below, can be tailored to have high impedance and exhibit near-perfect absorption. The rectifying circuit 130 is coupled to the antenna end points 121/122, and includes circuit elements (one or more diodes, capacitors, inductors and/or resistors) that are configured to combine positive voltage pulses from the two captured RF signals $V_{121}$ & $V_{122}$ to generate a usable output voltage $V_{OUT}$. In some embodiments, the metamaterial resonator antenna arrangement facilitates nesting a smaller antenna within open spaces of a larger antenna, thereby facilitating capturing a wide range of RF frequencies without significantly changing the device's footprint (size), and thereby providing a highly scalable platform that facilitates remotely powering widely dispersed IC devices (e.g., sensors, processors, etc.) using either pre-existing RF signals (e.g., from ambient Wi-Fi signals) or dedicated charging RF sources. Moreover, because the metamaterial resonator antenna arrangement is formed on a substrate and can be configured for different RF frequencies, the present invention facilitates the low-cost production of RF energy harvesting device using inexpensive flexible plastic substrates and cost-effective printed electronics techniques, thereby minimizing overall manufacturing costs while maximizing the RF frequency band that can be converted into usable energy.

Referring again to FIG. 1, rectifying circuit 130 includes conductive structures 133-1 to 133-4 that are conformally disposed on the substrate surface 102 (i.e., generated during the same ink-jet printing run as that used to form antenna 120) in order to further minimize manufacturing costs. In the illustrated and presently preferred embodiment, rectifying circuit 130 utilizes two dissimilar Zero Bias Schottky diodes D1 and D2 and a capacitor C1 that are configured to combine the two captured RF signals $V_{121}$ and $V_{122}$ in a way that generates an output voltage $V_{OUT}$ with minimal energy loss. Specifically, first diode D1 is coupled by way of conductive structure 133-1 between first antenna end point 121 and a first node N1 (which in this case is implemented by conductive structure 133-3. A first terminal of capacitor C1 is coupled to second antenna end point 122 by way of conductive structure 133-2, and a second terminal is connected to conductive structure 133-3 (node N1). Second diode D2 is connected between first node N1 and a second node N2, which is implemented by conductive structure 133-4. A second capacitor C2 is coupled between first antenna end point 121 and node N2, and in one embodiment conductive structure 133-1 is coupled to a ground or other voltage source. In an exemplary embodiment, diode D1 is implemented using a (first) Zero Bias Schottky diode having a very low forward voltage (e.g., 120 mV or less), a peak inverse voltage of 1.0 V or less, and a reverse current resistance of 5 kΩ. Diode D2 is implemented using a (second) Zero Bias Schottky diode having a forward voltage of 150 mV or less (i.e., equal to or higher than that of diode D1), and a peak inverse voltage of at least 2.0 V (i.e., higher than that of diode D1), and a reverse current resistance of at least 10 kΩ (i.e., higher than that of diode D1). Capacitors C1 and C2 are either discrete (e.g., surface mounted) capacitor structures, or a fabricated capacitor structures (e.g., using printed electronics), and have a value determined in accordance with the characteristics (current and voltage) of DC output voltage $V_{OUT}$, and in a practical embodiment have a common capacitance value of 10 pF. With this arrangement, a first intermediate voltage generated at first node N1 comprises a sum of positive voltage pulses of first RF signal $V_{121}$, which are passed through first diode D1, and second AC signal $V_{122}$, which is passed through first capacitor C1. With this arrangement, a second intermediate voltage is generated at second node N2 in accordance with positive voltage pulses that are passed from the first node N1 through the second diode D2. When the metamaterial resonator antennas of the present invention are combined with this novel rectifying circuit, the resulting RF energy harvesting devices exhibit high energy conversion efficiencies than when conventional rectifying circuits are utilized. However, in other embodiments (not shown), RF energy harvesting devices including the metamaterial resonator antennas of the present invention and conventional rectifying circuits (e.g., using a voltage doubler circuit, such as a Greinacher circuit, to combine the two captured RF signals) may be beneficially utilized to generate a usable output voltage.

Figure 2:
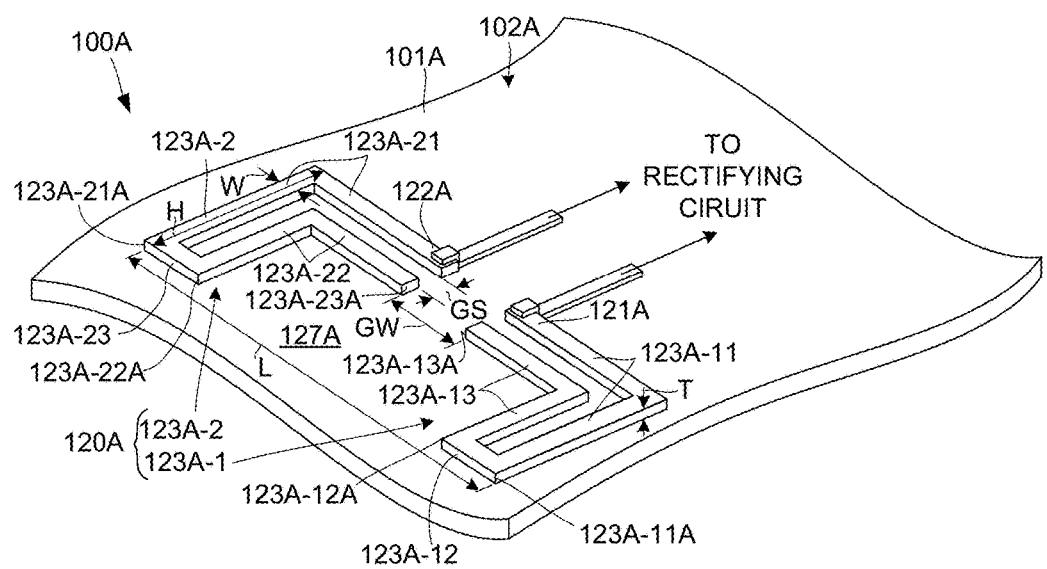
FIG. 2 is a top side perspective view showing an RF energy harvesting device including first two-part antenna configuration according to a specific embodiment of the present invention.

FIG. 2 is a top side perspective view showing an RF energy harvesting device 100A including an open C-shaped two-part antenna 120A formed by metal structures that are conformally disposed on upper surface 102A of flexible plastic substrate 101A. Antenna 120A represents a first example of a two-part dipole antenna arrangement made up of two bilaterally symmetrical metal elements 123A-1 and 123A-2. Metal element 123A-1 includes a first primary antenna segment 123A-11 extending from first antenna end point 121A, a first linking segment 123A-13 attached to the end of primary antenna segment 123A-11, and a first secondary antenna segment 123A-12 extending from linking segment 123A-13 to a first distal end point 123A-13A disposed adjacent to first antenna end point 121A. Note that first primary antenna segment 123A-11 and first secondary antenna segment 123A-12 are concentrically arranged such that a uniform gap spacing GS separates first primary antenna segment 123A-11 and first secondary antenna segment 123A-12 along their entire length. Similarly, second metal element 123A-2 includes a second primary antenna segment 123A-21 extending from second antenna end point 122A, a second linking segment 123A-23, and a second secondary antenna segment 123A-22 extending from second linking segment 123A-23 to a second distal end point 123A-23A disposed adjacent to second antenna end point 122A, where second primary antenna segment 123A-21 and second secondary antenna segment 123A-22 are also concentrically arranged and separated by gap spacing GS along their entire length. Metal elements 123A-1 and 123A-2 collectively form an open C-shaped pattern surrounding central region 127 on three sides.

Figure 3A:
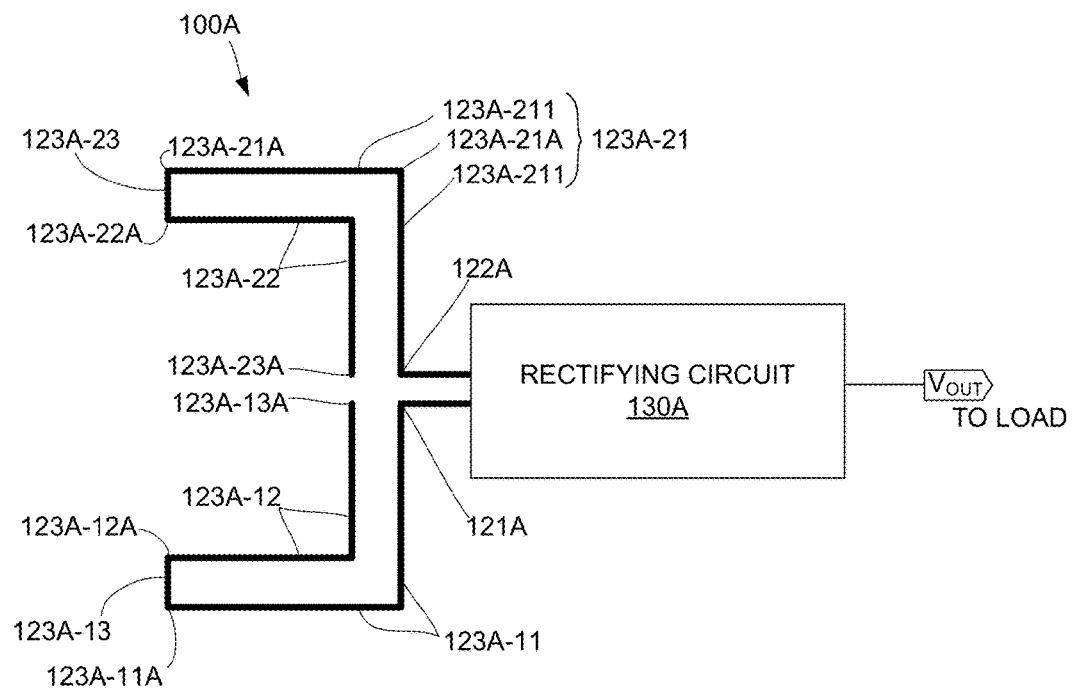
FIG. 3A is a simplified diagram showing an RF energy harvesting device including the two-part antenna of FIG. 2.

FIG. 3A is a simplified diagram showing RF energy harvesting device 100A of FIG. 2, where device 100A shows open C-shaped two-part antenna 120A using simple line structures in order to simplify the description of other embodiments set forth below. That is, FIG. 3A shows in simplified form antenna 120A coupled to a generalized rectifying circuit 130A, where primary antenna segments 123A-11 and 123A-21, secondary segments 123A-12 and 123A-22, and linking segments 123A-13 and 123A-23 are indicated by solid black lines. As further illustrated in FIG. 3A, each of primary antenna segments 123A-11 and 123A-21 and secondary segments 123A-12 and 123A-22 comprises at least two linear segments connected by a corner portion. For example, referring to the upper portion of FIG. 3A, second primary antenna segment 123A-21 includes two linear segments 123A-211 and 123A-212 connected by a corner (90° angle) portion 123A-21A.

Figure 3B:
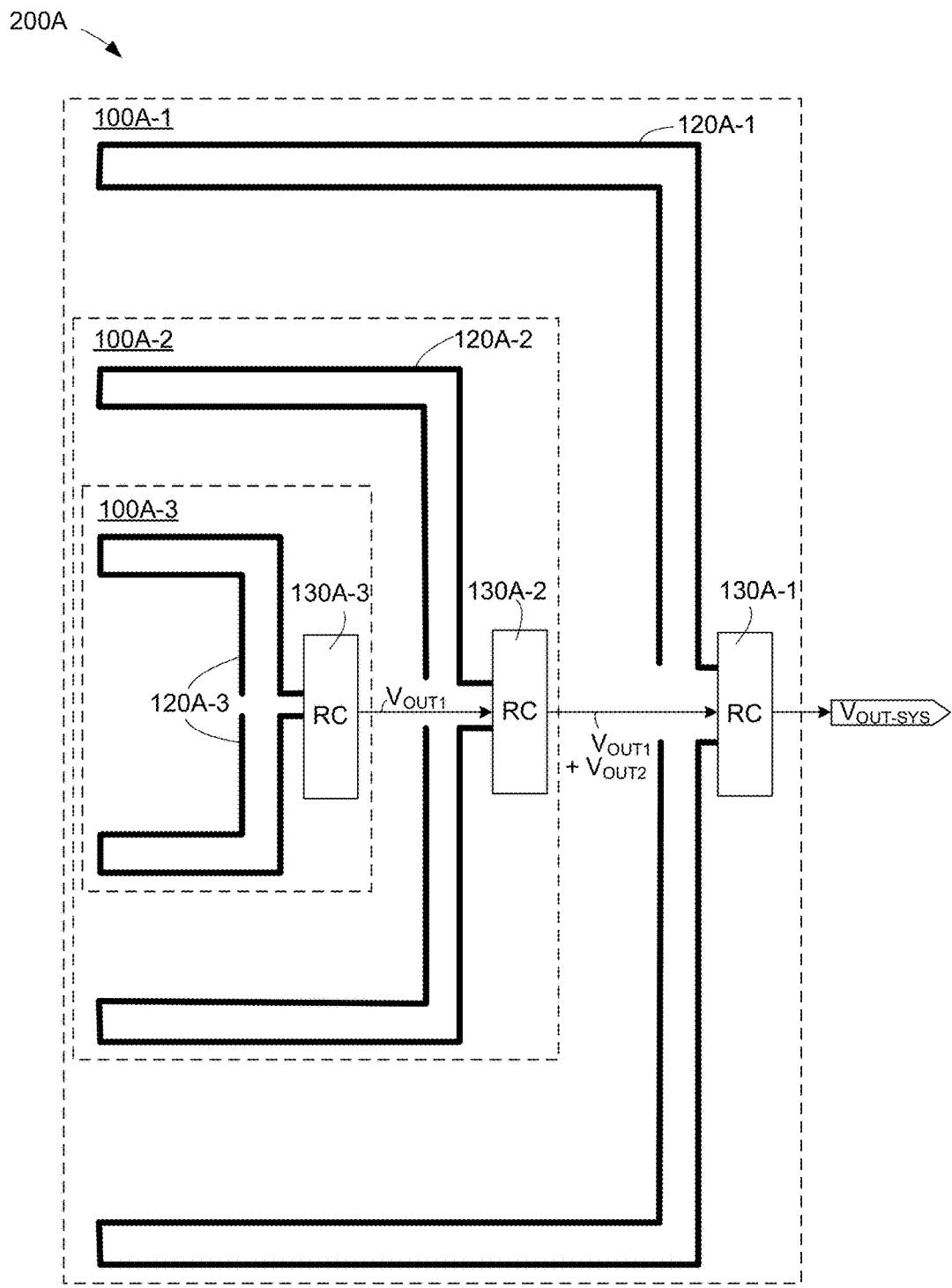
FIG. 3B is a simplified diagram showing an RF energy harvesting system including three RF energy harvesting devices of FIG. 3A in a nested arrangement.

FIG. 3B is a simplified diagram showing an RF energy harvesting system 200A including three RF energy harvesting devices 100A-1, 100A-2 and 100A-3 configured in a nested arrangement that illustrates an advantage of the open C-shaped configuration of antenna 120A (described above). Specifically, devices 100A-1, 100A-2 and 100A-3 respectively include three open C-shaped antennas 120A-1, 120A-2 and 120A-3, each coupled to an associated rectifying circuit 130A-1, 130A-2 and 130A-3 facilitate generate an combined system output voltage $V_{OUT-SYS}$ utilizing, for example, a parallel configuration similar to that described below with reference to FIG. 5. As illustrated in FIG. 3B, an advantage to forming metamaterial resonant antennas using the open C-shaped configuration described above is that multiple antennas of different sized can be concentrically "nested", which facilitates capturing RF energy over a wide range of RF frequencies without increasing the overall device/system footprint. That is, because antennas 120A-1, 120A-2 and 120A-3 have different sizes, each has a different inductance and hence resonates at a different RF frequency. By nesting antennas 120A-2 and 120A-3 inside the footprint of antenna 120A-1, system 200A facilitates capturing energy over a wider range of RF frequencies than would be possible using antenna 120A-1 alone, without increasing the substrate area required for antenna 120A.

Figure 4A:
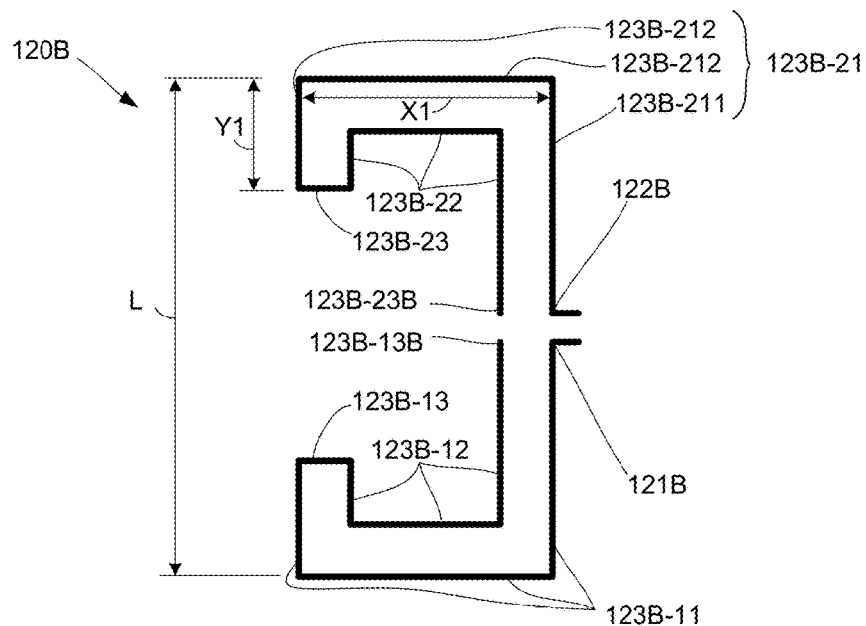
FIGS. 4A, 4B and 4C are simplified diagrams showing two-part antenna configurations according to alternative specific embodiments of the present invention.
Figures 4B, 4C:
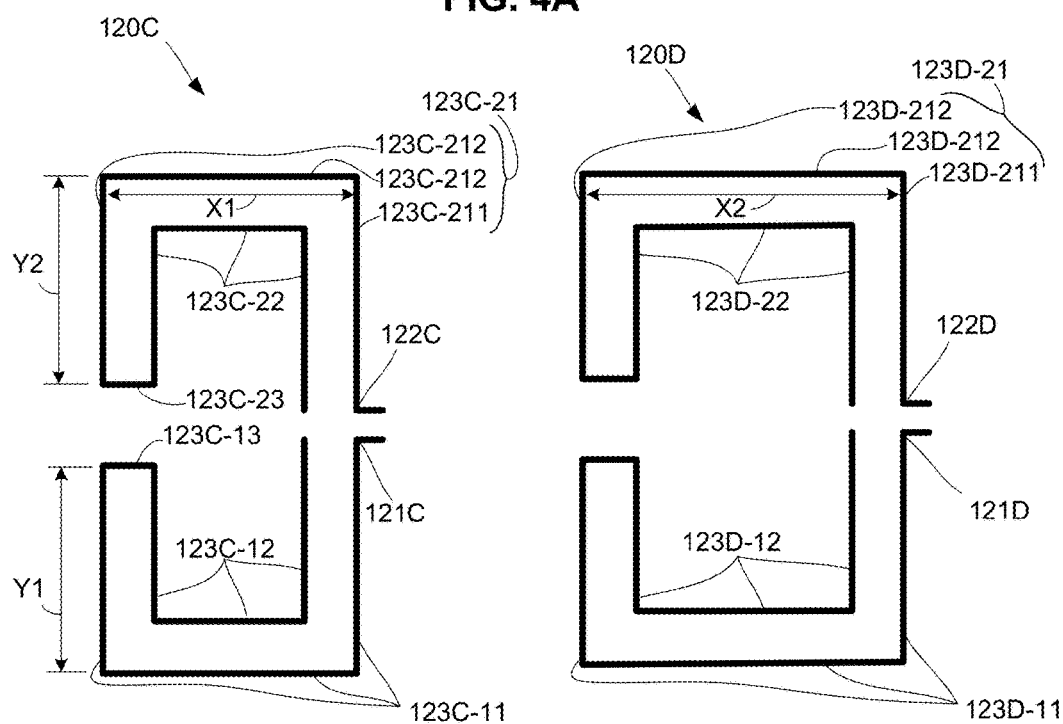

FIGS. 4A, 4B and 4C are simplified diagrams showing three additional two-part dipole antenna configurations that illustrate other approaches (i.e., in addition to increasing antenna size, as illustrated in FIG. 3B) for tailoring antenna inductance according to alternative specific embodiments of the present invention. In each case, the primary antenna segments and secondary antenna segments include three interconnected linear sections that collectively form a C-shaped pattern, where dimensions of the three linear sections are changed to illustrate how metamaterial resonator antennas are tailored to achieve difference inductance values, whereby the antennas are altered to resonate at (and thereby collect energy from) different RF frequencies. For example, referring to FIG. 4A, antenna 120B includes primary segments 123B-11 and 123B-21 and secondary segments 123B-12 and 123B-22 that are connected by linking sections 123B-13 and 123B-23 in a manner similar to that described above with reference to antenna 120A (FIG. 2). Assuming the overall length L and width X1 of antenna 120B is the same as that of antenna 120A (FIG. 2), FIG. 4A illustrates that the inductance of antenna 120B can be tailored to achieve different inductances with little or minimal change to the overall antenna footprint by adding a third (vertical) section to each of the primary and secondary antenna segments. For example, second primary antenna segment 123B-21 includes three interconnected linear sections 123B-211, 123B-212 and 123B-213 that form a C-shaped pattern, where vertical antenna section 123B-213 increases the length of primary antenna segment 123B-21 by length Y1 without increasing the overall footprint of antenna 120B. FIG. 4B indicates that further tailoring is achieved by further lengthening these third (vertical) sections. Antenna 120C includes three-section primary segments 123C-11 and 123C-21 and secondary segments 123C-12 and 123C-22 that are connected by linking sections 123C-13 and 123C-23 in a manner similar to that of antenna 120B (FIG. 4A), however the inductance of antenna 120C is altered by way of lengthening the additional section. Specifically, second primary antenna segment 123C-21 includes three interconnected linear sections 123C-211, 123C-212 and 123C-213, where vertical antenna section 123C-213 has a length Y2 that increases the inductance of antenna 120C over that of antenna 120B without increasing the overall footprint of antenna 120C. FIG. 4C illustrates antenna 120D, which achieves even higher inductance by way of lengthening the horizontal sections of primary segments 123D-11 and 123D-21 and secondary segments 123D-12 and 123D-22 to width X2. For example, second primary antenna segment 123D-21 includes three interconnected linear sections 123D-211, 123D-212 and 123D-213, where horizontal antenna section 123D-212 has a width X2 that increases the inductance of antenna 120D over that of antenna 120C without significantly increasing the overall footprint of antenna 120C.

Figure 5:
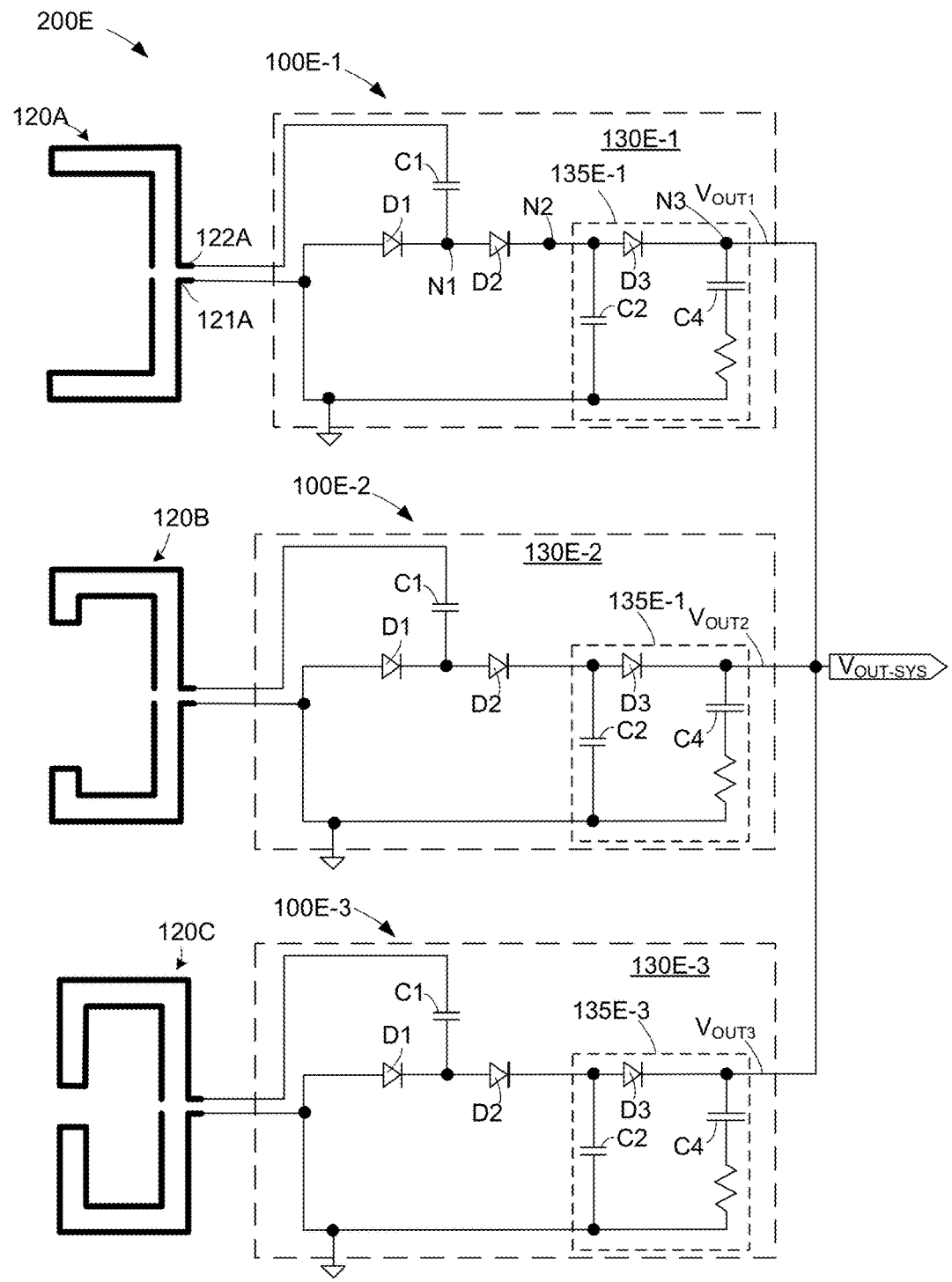
FIG. 5 is a simplified diagram showing an RF energy harvesting system utilizing two-part antennas according to another specific embodiment of the present invention.

FIG. 5 is a simplified circuit diagram showing a RF energy harvesting system 200E including RF energy harvesting devices 100E-1, 100E-2 and 100E-3 that are connected in parallel between common ground sources and common system output nodes to maximize the current level of the system output voltage $V_{OUT-SYS}$. To facilitate the generation of combined system output voltage $V_{OUT-SYS}$, devices 100E-1, 100E-2 and 100E-3 respectively include similar rectifying circuits 130E-1, 130E-2 and 130E-3 that are optimized to provide their respective output voltages $V_{OUT1}$ to $V_{OUT3}$ in a manner that facilitates combination. Each rectifying circuit 130E-1, 130E-2 and 130E-3 includes diodes D1 and D2 and capacitors C1 configured as described above with reference to FIG. 1. In addition, rectifying circuits 130E-1, 130E-2 and 130E-3 are similar in that they respectively include output control circuits 135E-1, 135E-2 and 135E-3 configured to convert the intermediate voltage generated at node N2 into DC output voltages $V_{OUT1}$ to $V_{OUT3}$. To facilitate combining these output voltages, output control circuits 135E-1, 135E-2 and 135E-3 include a (second) capacitor C2 that has essentially the same capacitance as capacitors C1, a third diode D3 and a storage capacitor C4 that are configured to store DC output voltages $V_{OUT1}$ to $V_{OUT3}$ for combination at system output node $V_{OUT-SYS}$. For example, referring to output control circuit 135E-1, diode D3 is connected between nodes N2 and N3 (which serves as an output node for rectifying circuit 130E-1), a first terminal of storage capacitor C4 is connected to node N3, and a resistor R2 connected between a second terminal of storage capacitor C4 and first antenna end point 121A (e.g., to the applied ground potential). In a practical embodiment, diode D3 is implemented using the same diode element as that utilized to implement diode D2 (e.g., a HSMS2850 Surface Mount Zero Bias Schottky Detector Diode manufactured by Agilent Technologies of Santa Clara, Calif., USA). Capacitor C3 is implemented using a capacitive element sized in accordance with the characteristics (current and voltage) of DC output voltage $V_{OUT}$, and the size and characteristics of the system voltage present on system output node $V_{OUT-SYS}$. In an exemplary practical embodiment, utilizing the diode and capacitor component values mentioned above, capacitor C3 has a capacitance of 100 pF, and resistor R2 has a nominal resistive value of 1Ω. Output control circuit 135E-2 and 135E-3 are configured identically to output control circuit 135E-1.

According to an aspect of the embodiment shown in FIG. 5, each device 100E-1, 100E-2 and 100E-3 includes a different two-part dipole metamaterial resonator antenna 120A, 120B and 120C, whereby devices 100E-1, 100E-2 and 100E-3 are configured to convert RF energy having different frequencies into output voltages $V_{OUT1}$, $V_{OUT2}$ and $V_{OUT3}$. Two-part dipole metamaterial resonator antenna 120A, 120B and 120C are described in detail above. Because antennas 120A, 120B and 120C have different configurations (sizes), each generates an output voltage dependent on the availability of sufficient RF energy at the frequencies to which each antenna resonates. System 200E is therefore configured to generate output current over a much broader RF frequency range than would be possible using a single antenna by utilizing three different antenna arrangements.

Figure 6A:
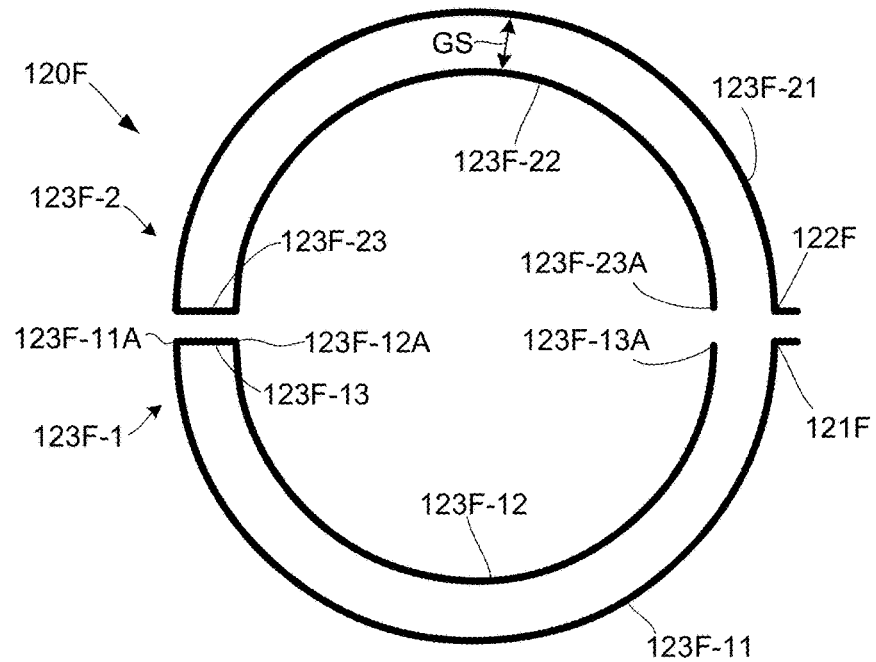
FIGS. 6A and 6B are simplified diagrams showing curved two-part antenna configurations according to alternative specific embodiments of the present invention.
Figure 6B:
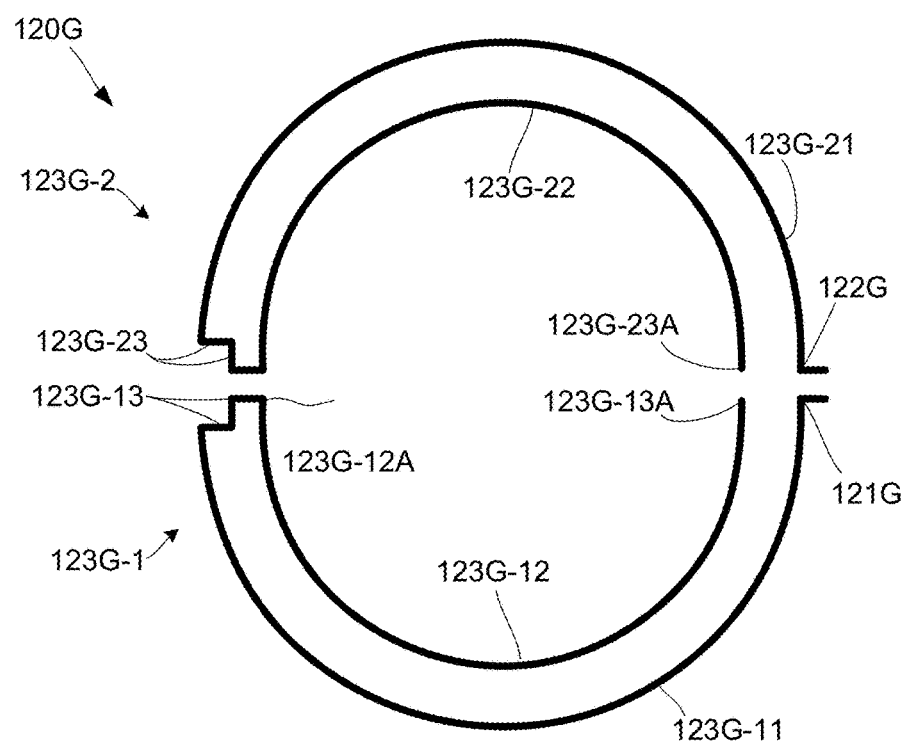

FIGS. 6A and 6B are simplified diagrams showing two curved two-part metamaterial resonator antennas 120F and 120G according to additional alternative specific embodiments of the present invention. Similar to the straight-section embodiments described above, each antenna 120F and 120G includes two bilaterally symmetrical metal elements 123F-1 and 123F-2 and 123G-1 and 123G-2, each including concentric, continuously-curved (e.g., substantially semi-circular) primary and secondary segments wire segments that are connected by a short linking segment.

Referring to FIG. 6A, metal element 123F-1 of antenna 120F includes a curved primary segment 123F-11 extending from antenna end point 121F to a (first) midpoint 123A-11A, a straight linking segment 123F-13 extending from midpoint 123F-11A to midpoint 123F-12A, and a curved secondary antenna segment 123F-12 extending from the second midpoint 123F-12A to a distal end point 124F-13A. Curved primary segment 123F-11 and curved secondary antenna segment 123F-12 are concentrically arranged such that they are separated along their entire length by a uniform gap spacing GS. Similarly, metal element 123F-2 includes a curved primary segment 123F-21 extending from antenna end point 121F to straight linking segment 123F-23, and a curved secondary antenna segment 123F-22 extending from linking segment 123F-23 to a distal end point 124F-23A, where curved primary segment 123F-21 and curved secondary antenna segment 123F-22 are concentrically arranged.

Referring to FIG. 6B, metal element 123G-1 of antenna 120G also includes a curved primary segment 123G-11 extending from antenna end point 121G to a midpoint 123A-11A, a straight linking segment 123G-13 extending from midpoint 123G-11A to midpoint 123G-12A, and a curved secondary antenna segment 123G-12 extending from the second midpoint 123G-12A to a distal end point 124G-13A, with curved primary segment 123G-11 and curved secondary antenna segment 123G-12 being concentrically arranged, and metal element 123G-2 includes a curved primary segment 123G-21 extending from antenna end point 122G to straight linking segment 123G-23, and a curved secondary antenna segment 123G-22 extending from linking segment 123G-23 to a distal end point 124G-23A, where curved primary segment 123G-21 and curved secondary antenna segment 123G-22 are concentrically arranged. Antenna 120G differs from antenna 120F in that, where linking segments 123F-13 and 123F-23 of antenna 120F are implemented by straight (linear shaped) wire structures, linking segments 123G-13 and 123G-23 of antenna 120G comprise two-segment step-shaped wire structures arranged such that the length primary antenna segments 123G-11 and 123G-21 is equal to the lengths of first secondary antenna segments 123G-12 and 123G-22, which facilitates improved antenna performance.

Figure 7:
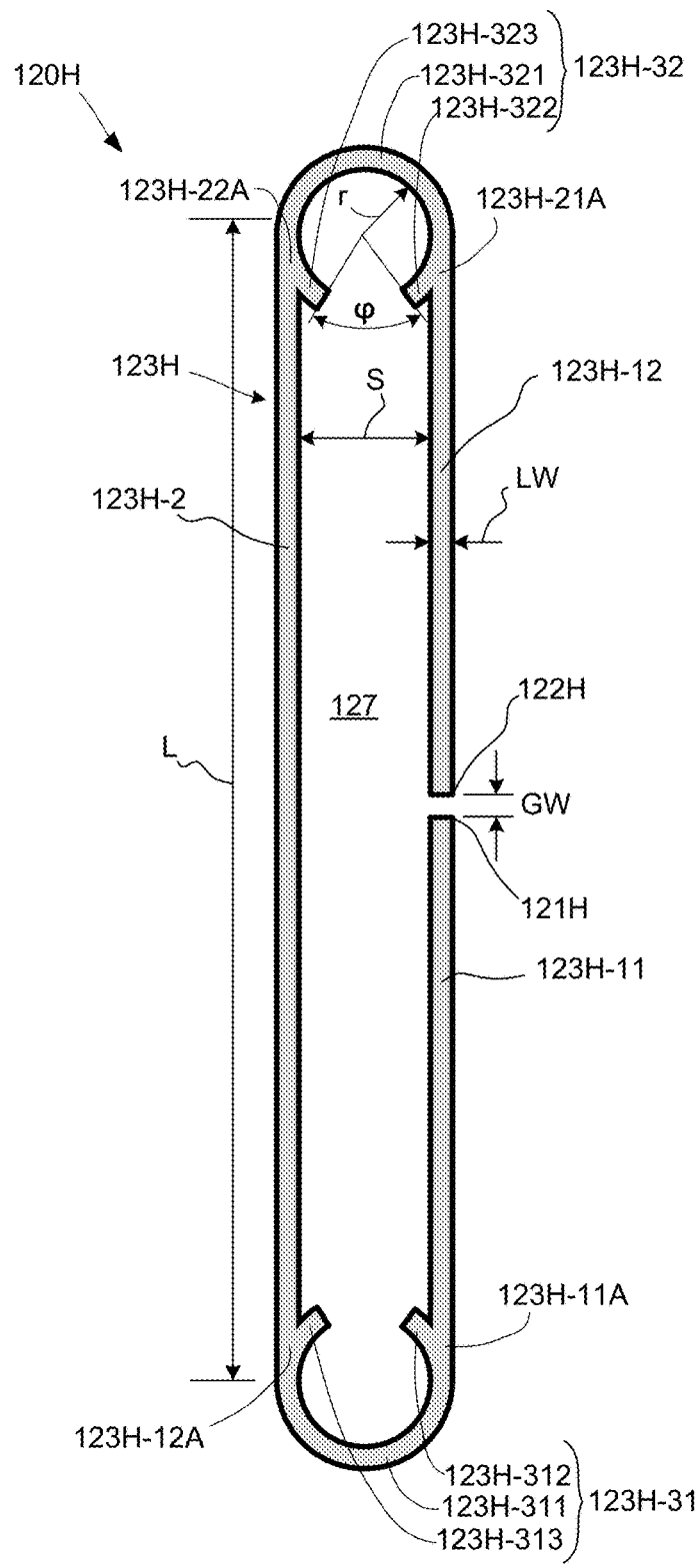
FIG. 7 is a top plan view showing a "racetrack-type" metamaterial resonator antenna according to another specific embodiment of the present invention.

FIG. 7 is a top plan view showing a "racetrack-type" metamaterial resonator antenna 120H according to another specific embodiment of the present invention. Unlike the two-part dipole embodiments described above, antenna 120H has a single-piece (integral, contiguous) metal element 123H including (first and second) primary antenna segments 123H-11 and 123H-12 disposed on a first side of the "racetrack", a secondary antenna segment 123H-2 disposed on the second side of the "racetrack", and two open-circle linking segments 12H-31 and 123H-32 forming the two "curves" of the "racetrack". Primary antenna segments 123H-11 and 123H-12 are linear metal structures that are collinearly arranged and separated by a gap GW defined between the first and second antenna end points 121H and 122H. That is, referring to FIG. 7, primary antenna segment 123H-11 extends straight downward from end point 121H to a first midpoint 123H-11A, and primary antenna segment 123H-21 extends upward from end point 122H to a second midpoint 123H-21A. Secondary antenna segment 123H-2 is a continuous metal structure disposed parallel to and spaced at a distance S from primary antenna segments 123H-11 and 123-12, and extends substantially the entire length L between third and fourth midpoints 123H-12A and 123H-22A. Linking segment 123H-31 includes a semi-circular section 123H-311 connected between a lower end of primary antenna segment 123H-11 and a lower end of secondary antenna segment 123H-2 (i.e., between midpoints 123H-11A and 123H-12A), and (first and second) curved end sections 123H-312 and 123H-313 extending from semi-circular section 123H-311 into space 127 (i.e., into a region between primary antenna segment 123H-11 and secondary antenna segment 123H-2). Linking segment 123H-32 includes a semi-circular section 123H-321 connected between upper ends of second primary antenna segment 123H-12 and secondary antenna segment 123H-2 (i.e., between midpoints 123H-21A and 123H-22A), and (third and fourth) curved end sections 123H-322 and 123H-323 extending from semi-circular section 123H-321 into space 127. The resulting "racetrack-type" antenna configuration resonates at an associated bandwidth range such that captured RF signals generated on antenna end points 121H and 122H are 180° out-of-phase from each other. An advantage provided by antenna 120H is that this "racetrack-type" antenna configuration was found to capture RF signals over a substantially higher frequency range than the two-part dipole antenna configurations described above. Similar to the two-part configurations, the impedance of antenna 120H is tunable by way of increasing or decreasing the antenna footprint (size). In addition, the "racetrack-type" antenna configuration facilitates further "tunability" without changing the overall footprint by way of changing the gaps separating the curved end sections (e.g., the distance separating end sections 123H-322 and 123H-323), or by adding one or more additional "racetrack loops" to the antenna structure, as described in additional detail below. In a practical embodiment, a "racetrack-type" antenna was formed by the present inventors using silver ink (10μΩ/cm) disposed on a PET substrate (250 μm thick) with segments having a thickness of 8 μm and line widths LW of 2.5 mm, where racetrack structure included a straight-section length L of 120 mm and linking segments having an inner radius r of 6.45 mm (i.e., having an overall antenna length of approximately 5.8 inches), with the curved end segments formed using an opening angle φ of 60°, and with a gap width GW of 2.5 mm. The resulting structure was found to resonate with peak efficiency at 914 MHz, and exhibited less than 10% loss in accepted power in the range of approximately 825 MHz to 1050 MHz.

Figure 8:
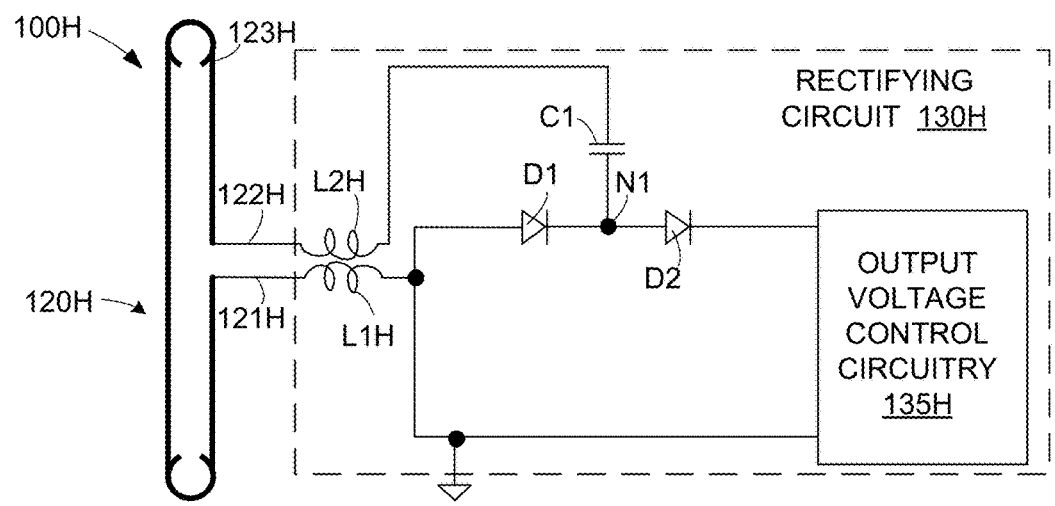
FIG. 8 is a simplified diagram showing an RF energy harvesting device including the "racetrack-type" antenna of FIG. 7.

FIG. 8 is a simplified diagram showing an RF energy harvesting device 100H including "racetrack-type" metamaterial resonator antenna 120H of FIG. 7. In this case, rectifying circuit 130H includes two discrete inductors L1H and L2H that are needed to facilitate proper transmission of captured RF signals to the other elements of rectifying circuit 130H. Specifically, inductor L1H is coupled between first antenna end point 121H and diode D1, and inductor L2H is coupled between antenna end point 122H and capacitor C1. In one embodiment, inductors L1H and L2H have the same (common) inductance value, and form a balanced circuit with antenna 120H and the elements of rectifying circuit 130H (i.e., capacitor C1, diodes D1 and D2, and output control circuit 135H, which may be implemented using any of the configurations described in copending application Ser. No. 14/582,002 entitled "RECTIFYING CIRCUIT FOR MULTIBAND RADIO FREQUENCY (RF) ENERGY HARVESTING", which is incorporated herein by reference in its entirety.

Figure 9:
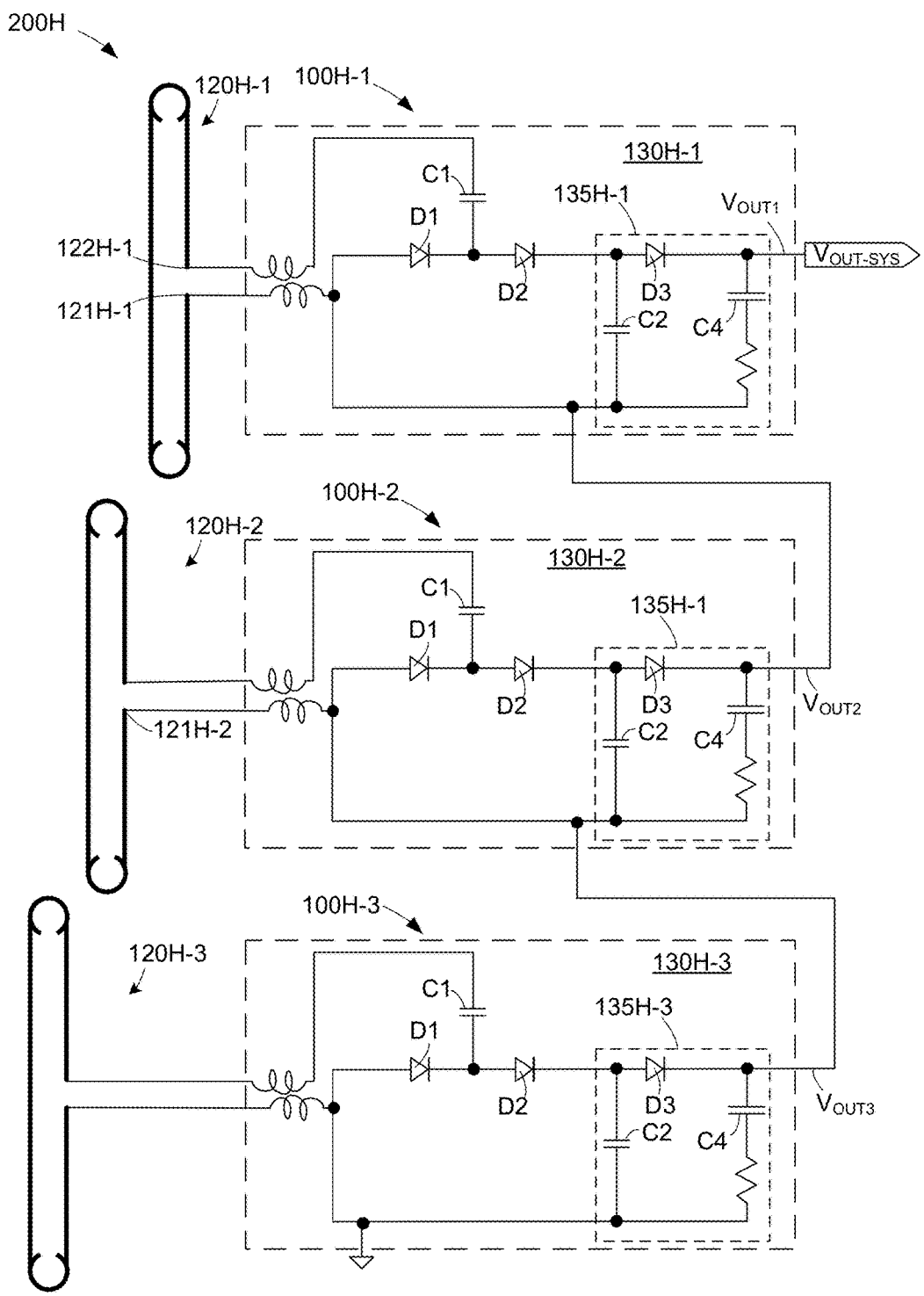
FIG. 9 is a simplified diagram showing an RF energy harvesting system utilizing "racetrack-type" antennas according to another specific embodiment of the present invention.

FIG. 9 is a simplified diagram showing an RF energy harvesting system 200H made up of three devices 100H-1, 100H-2, and 100H-3 respectively including "racetrack-type" metamaterial resonator antennas 120H-1 to 120H-3, where the output terminals of devices 100H-1, 100H-2, and 100H-3 are connected in series such that the second antenna end point of at least one RF energy harvesting device is connected to the output node of an adjacent RF energy harvesting device. According to an aspect of the disclosed embodiment, each energy harvesting device 100H-1 to 100H-3 includes a substantially identical "racetrack" antenna configuration. For example, device 100H-1 includes "racetrack" antenna 120H-1 configured as described above to resonate at RF frequencies within an associated bandwidth range. Device 100H-2 includes antenna 120H-2 and device 100H-3 includes antenna 120H-3, where antennas 120H-2 and 120H-3 are substantially identical in configuration with antenna 120H-1 (i.e., such that all three antennas resonate at the same RF frequency, and such that all three antennas generate substantially the same amount of energy). Each energy harvesting device 100H-1 to 100H-3 also includes a substantially identical rectifying circuit. For example, device 100H-1 includes rectifying circuit 130H-1 including a first diode D1 coupled between antenna end point 121H-1 and a first node N1, a first capacitor C1 coupled between end point 122H-1 and node N1, and a second diode D2 connected between node N1 and a second node N2. Rectifying circuit 130H-1 also includes an output control circuit 135H-1 coupled to node N2 that is configured (i.e., by way of third diode D3, second capacitor C2 that has the same capacitance as capacitor C1, and storage capacitor C4) to convert the intermediate voltage generated on node N2 into DC output voltage $V_{OUT1}$. Similarly, energy harvesting devices 100H-2 and 100H-3 respectively include rectifying circuits 130H-2 and 130H-3 having diodes D1 and D2 and capacitor C1, and output control circuits 135H-2 and 135H-3 including diodes D3 and capacitors C2 and C4) that generate respective DC output voltages $V_{OUT2}$ and $V_{OUT3}$.

According to the series-connected arrangement implemented by system 200H, RF energy harvesting devices 100H-1 to 100H-3 are connected such that DC output voltages $V_{OUT1}$, $V_{OUT2}$ and $V_{OUT3}$ are combined such that system output voltage $V_{OUT-SYS}$ is maximized. Specifically, first antenna end point 121H-2 of RF energy harvesting device 100H-2 is connected to the output node of RF energy harvesting device 100H-3 (i.e., such that the ground plane of device 100H-2 is DC output voltage $V_{OUT3}$), whereby a voltage level of DC output voltage $V_{OUT2}$ generated at the output node of device 100H-2 is "boosted" by DC output voltage $V_{OUT3}$. Similarly, antenna end point 121H-1 of RF energy harvesting device 100H-1 is connected to the output node of RF energy harvesting device 100H-3, whereby a voltage level of DC output voltage $V_{OUT3}$ generated at the output node of device 100H-1 is "boosted" by DC output voltages $V_{OUT2}$ and $V_{OUT3}$. Hence, the voltage level of system output voltage $V_{OUT-SYS}$ is maximized by the series arrangement.

Although not illustrated, it is understood that the "racetrack-type" antenna configuration may also be used in a nested-device arrangement similar to that shown and described above with reference to FIG. 3B.

Figures 10A, 10B:
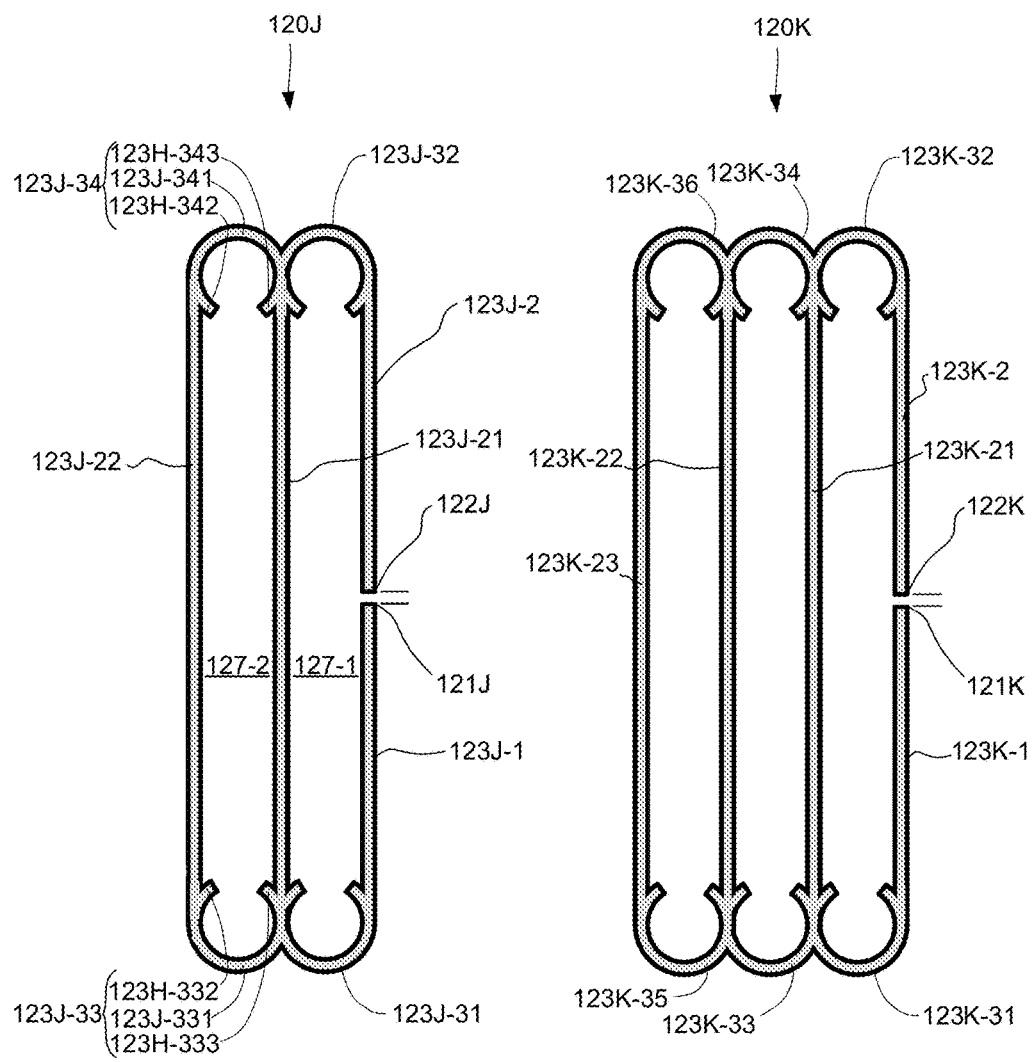
FIGS. 10A and 10B are top plan views showing two-loop and three-loop "racetrack" antennas, respectively, according to alternative embodiments of the present invention.

FIGS. 10A and 10B are top plan views respectively showing a two-loop "racetrack-type" metamaterial resonator antenna 120J and a three-loop "racetrack" "racetrack-type" metamaterial resonator antenna according to alternative embodiments of the present invention. In addition to tailoring the impedance of a racetrack antenna by altering the length and radius diameters of the "racetrack" shape, and by changing the gap distance between the curved end portions (as described above), it is also possible to tailor the antenna's impedance by way of adding one or more additional "loop" structures (i.e., such that the single integral metal antenna structure includes two or more "loops" as described below).

Referring to FIG. 10A, similar to the embodiment described above with reference to FIG. 7, antenna 120J includes a first "loop" structure surrounding region 127-1 formed by primary antenna segments 123J-11 and 123J-12 respectively extending from end points 121J and 122J, a (first) secondary antenna segment 123J-21, and (first and second) circular linking segments 123J-31 and 123J-32, which are configured in the manner described above with reference to FIG. 7. In addition, antenna 120J includes a second "loop" structure surrounding region 127-2 formed by first secondary antenna segment 123J-21, a second secondary antenna segment 123J-22 disposed parallel to primary antenna segments 123J-11 and 123J-12 and to first secondary antenna segment 123J-21 (i.e., such that first secondary antenna segment 123J-21 is between primary antenna segments 123J-11 and 123J-12 and second secondary antenna segment 123J-22), a (third) linking segment 123J-33 including a third semi-circular section 123J-331 connected between the first lower end of the first secondary antenna segment 123J-21 and a first lower end of the second secondary antenna segment 123J-22, and (fifth and sixth) curved end sections 123J-332 and 123J-333 extending from third semi-circular section 123J-331 into region 127-2, and a (fourth) linking segment 123J-34 including a fourth semi-circular section 123J-341 connected between an upper end of secondary antenna segment 123J-22 and an upper end of the secondary antenna segment 123J-21, and (seventh and eight) curved end sections 123J-342 and 123J-343 extending from semi-circular section 123J-341 into space 127-2. The addition of the second "loop" structure increases the overall inductance of antenna 120J over that of antenna 120H (FIG. 7), whereby antenna 120J is tailored to resonate at a different RF frequency than antenna 120H.

Referring to FIG. 10B, similar to the embodiment described with reference to FIG. 10A, antenna 120K includes a first "loop" structure formed by primary antenna segments 123J-11 and 123J-12 extending from end points 121K and 122K, respectively, a (first) secondary antenna segment 123J-21, and (first and second) circular linking segments 123J-31 and 123J-32, and a second "loop" structure formed by (first) secondary antenna segment 123J-21, a (second) secondary antenna segment 123J-22, and (third and fourth) circular linking segments 123J-33 and 123J-34. In addition, antenna 120J includes a third "loop" structure formed by (second) secondary antenna segment 123J-22, a (third) secondary antenna segment 123J-23, a (fifth) linking segment 123J-35 connecting lower ends of second antenna segments 123J-22 and 123J-23, and a (sixth) linking segment 123J-36 connecting upper ends of second antenna segments 123J-22 and 123J-23. The addition of the third "loop" structure further increases the overall inductance of antenna 120K over that of antenna 120J (FIG. 10A).

Although fabrication costs associated with producing the RF energy harvesting devices/systems of the present invention are minimized using the printing techniques described above, many of the benefits described herein may be achieved using other fabrication techniques. For example, the antenna and rectifying circuit may be fabricated using normal printed circuit board methods on either rigid or flexible substrate. Alternatively, the devices systems may be formed by machining or sintering.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A radio frequency (RF) energy harvesting device comprising:
    a substrate having a substantially planar surface;
    a metamaterial resonator antenna including at least one metal element that is conformally fixedly disposed on the surface of the substrate, said at least one metal element including:
        a first primary antenna segment extending from a first antenna end point to a first midpoint,
        a second primary antenna segment extending from a second antenna end point to a second midpoint,
        at least one secondary antenna segment disposed parallel to and spaced from the first and second primary antenna segments by a uniform gap distance, said at least one secondary antenna segment having a first end disposed at a third midpoint and an opposing second end disposed at a fourth midpoint,
        a first linking segment connected between the first and third midpoints, and
        a second linking segment connected between the second and fourth midpoints,
        wherein the first and second primary antenna segments and said at least one secondary antenna segment are configured to resonate at RF frequencies that are within an associated bandwidth range such that a first captured RF signal is generated on the first antenna end point and a second captured RF signal is generated on the second antenna end point, said first capture RF signal being 180° out-of-phase from the second captured RF signal; and
    a rectifying circuit coupled to the first and second antenna end points, said rectifying circuit including circuit elements configured to combine positive voltage pulses from said first and second captured RF signals to an output node.

2. The RF energy harvesting device of claim 1, wherein said at least one elongated metal structure forming said metamaterial resonator antenna comprise a silver ink material.

3. The RF energy harvesting device of claim 1, wherein said rectifying circuit further comprises a plurality of conductive structures conformally fixedly disposed on the surface of the substrate.

4. The RF energy harvesting device of claim 3, wherein said rectifying circuit further comprises:
    a first diode coupled between the first antenna end point and a first node;
    a first capacitor coupled between the second antenna end point and the first node; and
    a second diode coupled between the first node and a second node,
    wherein the first diode has a lower forward voltage than the second diode, and the first diode has a lower reverse voltage than the second diode, whereby a first intermediate voltage generated at the first node comprises a sum of positive voltage pulses of the first RF signal that are passed through the first diode and the second AC signal passed through the first capacitor, and whereby a second intermediate voltage is generated at the second node in accordance with positive voltage pulses that are passed from the first node through the second diode.

5. The RF energy harvesting device of claim 3, wherein said rectifying circuit comprises a Greinacher circuit.

6. The RF energy harvesting device of claim 1, wherein said antenna comprises a two-part dipole antenna including first and second bilaterally symmetrical metal elements:
    wherein said first metal element includes said first primary antenna segment, said first linking segment, and a first secondary antenna segment extending from the first linking segment to a first distal end point disposed adjacent to the first antenna end point, said first primary antenna segment and said first secondary antenna segment being concentrically arranged such that a uniform gap spacing separates the first primary antenna segment and said first secondary antenna segment along their entire length; and
    wherein said second metal element includes said second primary antenna segment, said second linking segment, and a second secondary antenna segment extending from the second linking segment to a second distal end point disposed adjacent to the second antenna end point, said second primary antenna segment and said second secondary antenna segment being concentrically arranged such that said uniform gap spacing separates the second primary antenna segment and said second secondary antenna segment along their entire length.

7. The RF energy harvesting device of claim 6, wherein each of said first and second primary antenna segments and said first and second secondary wire segments comprises at least two linear segments connected by a corner portion.

8. The RF energy harvesting device of claim 7, wherein each of said first and second primary antenna segments and said first and second secondary wires comprises an L-shaped pattern.

9. The RF energy harvesting device of claim 7, wherein each of said first and second primary antenna segments and said first and second secondary antenna segments comprises three interconnected linear sections forming a C-shaped pattern.

10. The RF energy harvesting device of claim 6, wherein each of said first and second primary antenna segments and said first and second secondary antenna segments comprises continuously curved wire structures.

11. The RF energy harvesting device of claim 10, wherein each of said first and second linking segments comprises a linear shaped wire structure.

12. The RF energy harvesting device of claim 10, wherein each of said first and second linking segments comprises a step-shaped wire structure configured such that a length of said first primary antenna segment is equal to a length of said first secondary antenna segment, and such that a length of said second primary antenna segment is equal to a length of said second secondary antenna segment.

13. The RF energy harvesting device of claim 1, wherein said antenna comprises a single integral metal element comprising:

said first and second primary antenna segments comprising linear structures that are collinearly arranged and separated by a gap defined between the first and second antenna end points;

said secondary antenna segment disposed parallel to the first and second primary antenna segments;

said first linking segment comprising a first open-circle pattern including a first semi-circular section connected between the first primary antenna segment and a first end of the secondary antenna segment, and first and second curved end sections extending from said first semi-circular section into a space between said first primary antenna segment and the secondary antenna segment, and said second linking segment comprising a second open-circle pattern including a second semi-circular section connected between the second primary antenna segment and a second end of the secondary antenna segment, and third and fourth curved end sections extending from said second semi-circular section into a space between said second primary antenna segment and the secondary antenna segment.

14. The RF energy harvesting device of claim 13, wherein said single integral metal element further comprises:

a second secondary antenna segment disposed parallel to the first and second primary antenna segments and to the first secondary antenna segment such that the first secondary antenna segment is between first and second primary antenna segments and the second secondary antenna segment;

a third linking segment comprising a third open-circle pattern including a third semi-circular section connected between the first end of the first secondary antenna segment and a first end of the second secondary antenna segment, and fifth and sixth curved end sections extending from said third semi-circular section into a space between said first and second secondary segments, and fourth linking segment comprising a fourth open-circle pattern including a fourth semi-circular section connected between the second end of the first secondary antenna segment and a second end of the second secondary antenna segment, and seventh and eight curved end sections extending from said fourth semi-circular section into the space between said first and second secondary segments.

15. A radio frequency (RF) energy harvesting system including a plurality of RF energy harvesting devices, each RF energy harvesting device comprising:

a metamaterial resonator antenna including at least one metal element that is conformally fixedly disposed on the surface of a substrate, said at least one metal element including:

a first primary antenna segment extending from a first antenna end point to a first midpoint, a second primary antenna segment extending from a second first antenna end point to a second midpoint, at least one secondary antenna segment disposed parallel to and spaced from the first and second primary antenna segments by a uniform gap distance, said at least one secondary antenna segment having a first end disposed at a third midpoint and an opposing second end disposed at a fourth midpoint, a first linking segment connected between the first and third midpoints, and a second linking segment connected between the second and fourth midpoints, wherein the first and second primary antenna segments and said at least one secondary antenna segment are configured to resonate at RF frequencies that are within an associated bandwidth range such that a first captured RF signal is generated on the first antenna end point and a second captured RF signal is generated on the second antenna end point, said first capture RF signal being 180° out-of-phase from the second captured RF signal; and a rectifying circuit coupled to the first and second antenna end points, said rectifying circuit including circuit elements configured to pass positive voltage pulses from said first and second captured RF signals to an output node, wherein the plurality of RF energy harvesting devices are coupled together to generate a combined system output voltage.

16. The RF energy harvesting system of claim 15, wherein the output control circuit of each of the rectifying circuits comprises:

a first diode coupled between the first antenna end point and a first node;

a first capacitor coupled between the second end point and the first node;

a second diode coupled between the first node and a second node, wherein the first diode has a lower forward voltage than the second diode, and the first diode has a lower reverse voltage than the second diode; and an output control circuit coupled between the second node and an output node, said output control circuit being configured to convert a second intermediate voltage generated on the second node into a direct current (DC) output voltage, and wherein the plurality of RF energy harvesting devices are coupled together to generate a combined system output voltage.

17. The RF energy harvesting system of claim 16, wherein the output nodes of all of the plurality of RF energy harvesting devices are connected to a common system output node.

18. The RF energy harvesting system of claim 16, wherein the antenna of each of the RF energy harvesting devices comprises a two-part dipole antenna including first and second bilaterally symmetrical metal elements:

wherein said first metal element includes said first primary antenna segment, said first linking segment, and a first secondary antenna segment extending from the first linking segment to a first distal end point disposed adjacent to the first antenna end point, said first primary antenna segment and said first secondary antenna segment being concentrically arranged such that a uniform gap spacing separates the first primary antenna segment and said first secondary antenna segment along their entire length; and wherein said second metal element includes said second primary antenna segment, said second linking segment, and a second secondary antenna segment extending from the second linking segment to a second distal end point disposed adjacent to the second antenna end point, said second primary antenna segment and said second secondary antenna segment being concentrically arranged such that said uniform gap spacing separates the second primary antenna segment and said second secondary antenna segment along their entire length.

19. The RF energy harvesting system of claim 16, wherein the plurality of RF energy harvesting devices are connected in series such that the second antenna end point of a first said RF energy harvesting device is connected to the output node of a second said RF energy harvesting device.

20. The RF energy harvesting system of claim 19, wherein the antenna of each of the RF energy harvesting devices comprises single integral metal element comprising:

said first and second primary antenna segments comprising linear structures that are collinearly arranged and separated by a gap defined between the first and second antenna end points;

said secondary antenna segment disposed parallel to the first and second primary antenna segments;

said first linking segment comprising a first open-circle pattern including a first semi-circular section connected between the first primary antenna segment and a first end of the secondary antenna segment, and first and second curved end sections extending from said first semi-circular section into a space between said first primary antenna segment and the secondary antenna segment, and said second linking segment comprising a second open-circle pattern including a second semi-circular section connected between the second primary antenna segment and a second end of the secondary antenna segment, and third and fourth curved end sections extending from said second semi-circular section into a space between said second primary antenna segment and the secondary antenna segment.

21. A metamaterial resonator antenna comprising at least one metal element including:

a first primary antenna segment extending from a first antenna end point to a first midpoint, a second primary antenna segment extending from a second antenna end point to a second midpoint, at least one secondary antenna segment disposed parallel to and spaced from the first and second primary antenna segments by a uniform gap distance, said at least one secondary antenna segment having a first end disposed at a third midpoint and an opposing second end disposed at a fourth midpoint, a first linking segment connected between the first and third midpoints, and a second linking segment connected between the second and fourth midpoints, wherein the first and second primary antenna segments and said at least one secondary antenna segment are configured to resonate at frequencies that are within an associated bandwidth range such that a first captured signal is generated on the first antenna end point and a second captured signal is generated on the second antenna end point, said first capture signal being 180° out-of-phase from the second captured signal, wherein said at least one elongated metal element forming said metamaterial resonator antenna comprises a silver ink material.

22. The metamaterial resonator antenna of claim 21, wherein said at least one metal element comprises a single integral metal element comprising:

said first and second primary antenna segments comprising linear structures that are collinearly arranged and separated by a gap defined between the first and second antenna end points;

said secondary antenna segment disposed parallel to the first and second primary antenna segments;

said first linking segment comprising a first open-circle pattern including a first semi-circular section connected between the first primary antenna segment and a first end of the secondary antenna segment, and first and second curved end sections extending from said first semi-circular section into a space between said first primary antenna segment and the secondary antenna segment, and said second linking segment comprising a second open-circle pattern including a second semi-circular section connected between the second primary antenna segment and a second end of the secondary antenna segment, and third and fourth curved end sections extending from said second semi-circular section into a space between said second primary antenna segment and the secondary antenna segment.

* * * * *